United States Patent [19]
Watanabe et al.

[11] Patent Number: 5,270,846
[45] Date of Patent: Dec. 14, 1993

[54] FERROELECTRIC LIQUID CRYSTAL DEVICE HAVING PLURAL INORGANIC INSULATING LAYERS

[75] Inventors: Yasuyuki Watanabe, Chigasaki; Kenji Onuma, Isehara; Mayumi Yoshioka, Hiratsuka, all of Japan

[73] Assignee: Canon Kabushiki Kaisha, Tokyo, Japan

[21] Appl. No.: 744,394

[22] Filed: Aug. 13, 1991

[30] Foreign Application Priority Data

Aug. 13, 1990 [JP] Japan ................................ 2-211624
Aug. 10, 1991 [JP] Japan ................................ 3-224903

[51] Int. Cl.⁵ ...................... G02F 1/133; G02F 1/137
[52] U.S. Cl. ...................................... 359/74; 359/75; 359/68; 359/79; 359/87
[58] Field of Search ............... 359/75, 68, 76, 77, 359/78, 79, 100, 74, 87

[56] References Cited

U.S. PATENT DOCUMENTS

| | | | |
|---|---|---|---|
| 4,561,726 | 12/1985 | Goodby et al. | 350/341 |
| 4,589,996 | 5/1986 | Inoue et al. | 252/299.65 |
| 4,592,858 | 6/1986 | Higuchi et al. | 252/299.66 |
| 4,596,667 | 6/1986 | Inukai et al. | 252/299.65 |
| 4,613,209 | 9/1986 | Goodby et al. | 350/350 S |
| 4,614,609 | 9/1986 | Inoue et al. | 252/299.66 |
| 4,622,165 | 11/1986 | Kano et al. | 252/299.65 |
| 4,902,106 | 2/1990 | Dijon et al. | 359/75 |
| 4,904,059 | 2/1990 | Torigoe | 359/79 |
| 4,917,471 | 4/1990 | Takao et al. | 359/75 |
| 4,932,757 | 6/1990 | Hanyu et al. | 359/75 |
| 4,932,758 | 6/1990 | Hanyu et al. | 350/350 S |
| 5,016,989 | 5/1991 | Okada | 359/75 |
| 5,099,344 | 3/1992 | Tsuboyama et al. | 359/100 |
| 5,126,867 | 6/1992 | Ishiwata | 359/75 |
| 5,153,755 | 10/1992 | Higa | 359/75 |
| 5,192,596 | 3/1993 | Hanyu et al. | 359/75 |
| 5,194,976 | 3/1993 | Nakano et al. | 359/68 |

FOREIGN PATENT DOCUMENTS 0183624 8/1986 Japan ...................... 359/75
63-225224 9/1988 Japan ...................... 359/74

OTHER PUBLICATIONS

Clark et al., "Structures and Applications of SSFLC Devices", Japan Display '86—Oct. 1986—pp. 456-458.
Kotai, "Solid State Physics", vol. 16, No. 3, pp. 16-23 (1981).
Alquie et al., "Le Journal de Physique-Lettres", vol. 35, pp. L69-L72 (1974).
Clark et al., "Appl. Phys. Lett.", vol. 36, No. 11, pp. 899-901 (1980).

Primary Examiner—William L. Sikes
Assistant Examiner—Tai V. Duong
Attorney, Agent, or Firm—Fitzpatrick, Cella, Harper & Scinto

[57] ABSTRACT

A ferroelectric liquid crystal device is prepared by disposing a ferroelectric liquid crystal between a pair of electrode plate structures. Each electrode plate structure is formed by coating a electrode pattern on a substrate with a multi-layer insulating layer including two insulating layers formed through difference processes. In a preferred embodiment, the first insulating layer is formed by sputtering of an inorganic oxide and the second insulating layer is formed as an inorganic oxide layer formed through wet-coating and calcination. The multi-layer insulating layer structure is effective for preventing occurrence of short circuit between opposite electrodes and providing a good alignment characteristic particularly when combined with a polyimide alignment film.

28 Claims, 3 Drawing Sheets

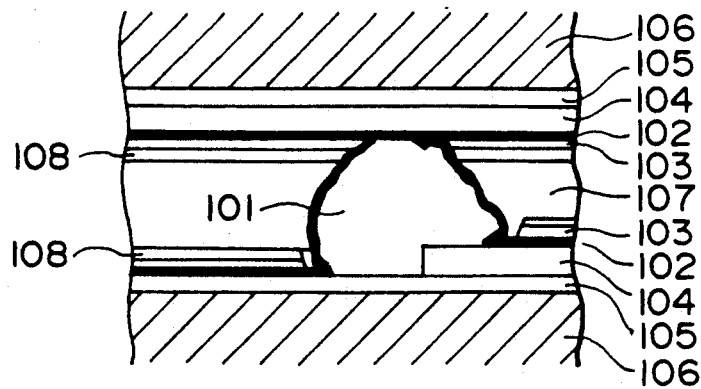
F I G. 1
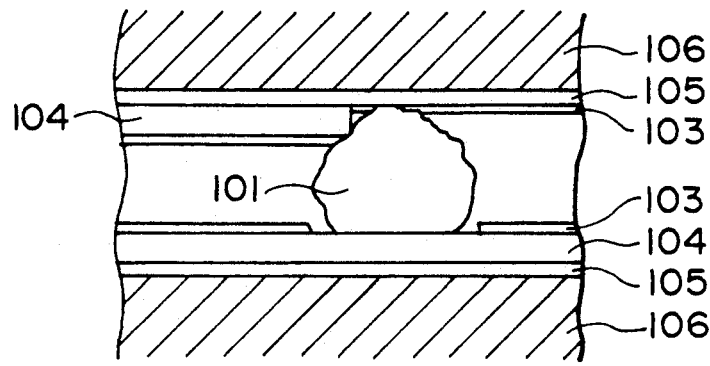
F I G. 2
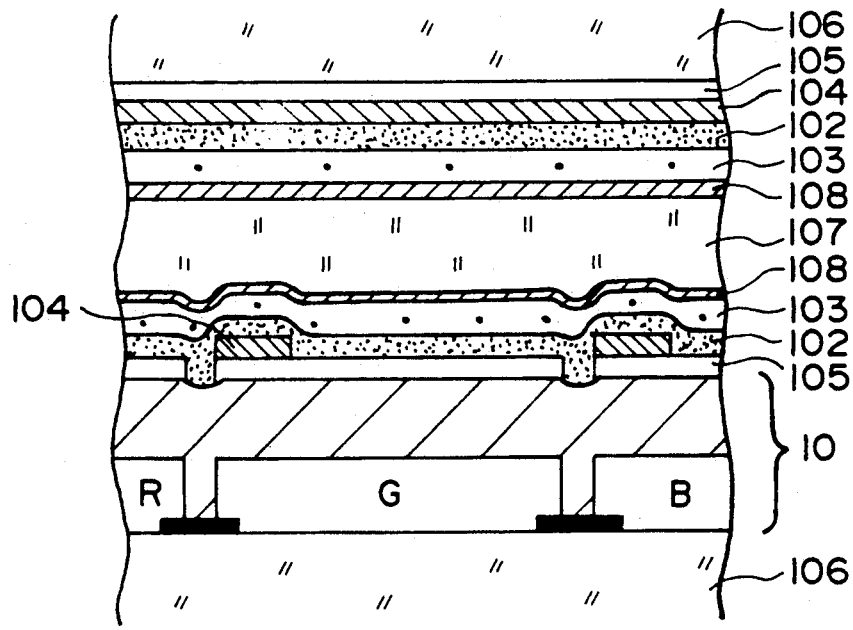
F I G. 3

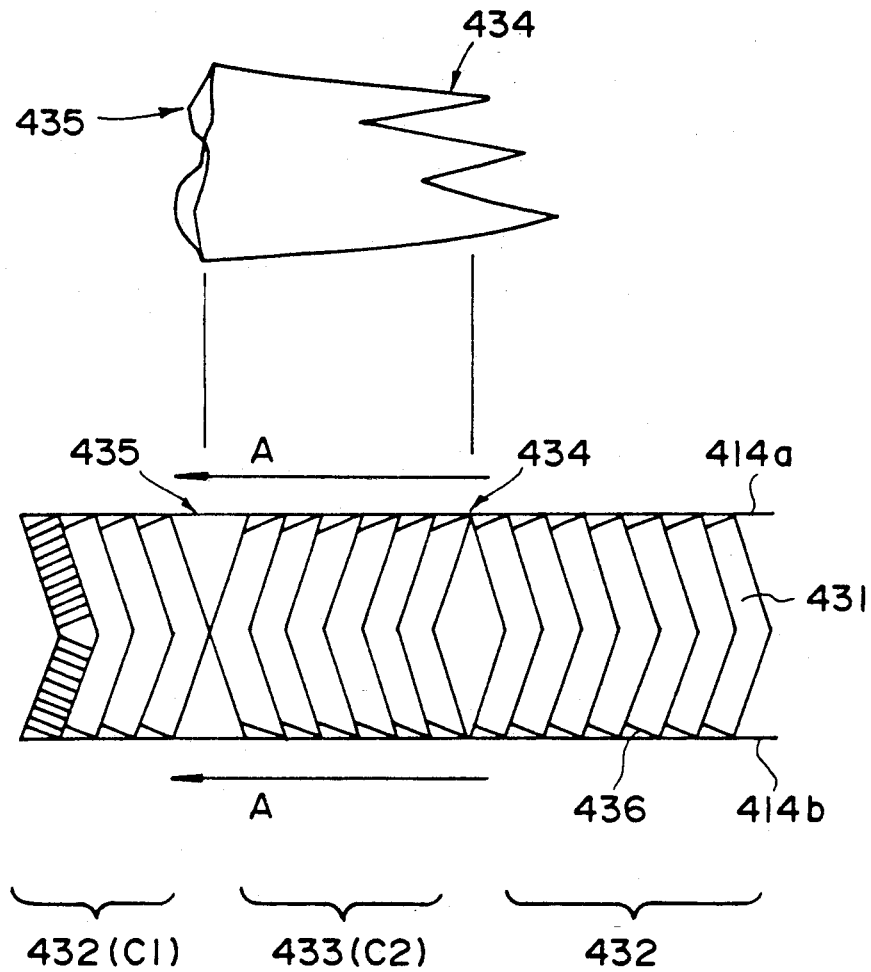
F I G. 4

FERROELECTRIC LIQUID CRYSTAL DEVICE HAVING PLURAL INORGANIC INSULATING LAYERS

FIELD OF THE INVENTION AND RELATED ART

The present invention relates to a liquid crystal device, particularly a ferroelectric liquid crystal device having an electrode plate structure carrying an inorganic oxide insulating film for ensuring an insulating between a pair of electrodes.

Hitherto, an $SiO_2$ film formed by sputtering has been generally used as an insulating film for accomplishing an insulation between a pair of electrodes sandwiching a liquid crystal.

Particularly, in a liquid crystal device using a ferroelectric liquid crystal(hereinafter sometimes abbreviated as "FLC"), an insulating film comprising $Ta_2O_5$ having a large dielectric constant as large as about 5 times that of $SiO_2$ has been used. This is because it is advantageous to use an insulating layer including an alignment film having a larger electric capacitance in view of FLC drive characteristic. Further, the thickness of the insulating film is made as thin as possible within an allowable dielectric strength so as to provide a large capacitance. Similarly, an alignment film having a small dielectric constant and yielding a large dielectric loss is also designed in a small thickness. In a thin alignment film thickness, however, an insulating film formed by sputtering tends to provide an inferior FLC alignment performance.

On the other hand, instead of using an expensive sputtering apparatus for film formation, film formation by coating and calcination has been examined. Particularly, it has been reported that an inorganic oxide film formed by such coating and calcination provides a good alignment characteristic for FLC in combination with an organic alignment film (Japanese Laid-Open Patent Application (JP-A) 183624/1986).

As the material for film formation by coating and calcination, hydroxides or alkoxides of silicon, titanium, tantalum, zirconium, etc., have been used. These materials are generally used in the form of a mixture solution in a polyhydric alcohol or derivative thereof having a high boiling point for coating by printing and calcination practically in combination with previously developed technique of forming an alignment film by offset-type flexography.

In addition to the good alignment performance for FLC, the inorganic oxide film formed by print- or wet-coating and calcination can provide a higher dielectric strength than a sputtered film when an appropriate metal is selected and/or mixed with silicon in an appropriate ratio. For example, a 1000 Å thick $Ta_2O_5$ film formed by printing has shown a dielectric strength of 45 volts or higher, a dielectric constant of about 17 and a good alignment performance when combined with a 40 Å-thick polyimide-type alignment film.

The dielectric constant is somewhat lower than 20 of a sputtered $Ta_2O_5$ film, but the dielectric strength corresponds to 25-30 volts at a thickness of 600 Å, which is higher than 15-20 volts of a sputtered film at the thickness In order to provide a satisfactory alignment characteristic, a thicker sputtered alignment film thickness is required, so that a combination of an alignment film and a printed inorganic oxide film is not disadvantageous in spite of a lower dielectric constant compared with a sputtered film in respect of a total electric capacitance.

However, such an inorganic oxide film formed by print-coating and calcination should be formed through calcination at 300° C. or below in view of restraint from other materials, such as metal wires. Such an inorganic oxide film formed through calcination at a low temperature is liable to have a lower hardness than that of a sputtered film.

As another difficulty of formation of an inorganic oxide film through printing, a printing liquid is liable to be repelled by a projection like that of a foreign matter in a size on the order of, e.g., 1 micron, thus failing to cover such a projection.

As a result, in case where an electroconductive foreign matter is present on an electrode pattern, such an inorganic oxide film by printing can fail to cover the foreign matter, and such an uncovered conductive foreign matter can further break an insulating film having a low hardness on a counter electrode plate to cause a short circuit between opposite electrodes.

In fact, as a result of actual cases, a panel using a printed inorganic oxide film has provided a higher rate of occurrence of short circuit between opposite electrodes in spite of a higher dielectric strength than a sputtered film.

Further, in the case of a ferroelectric liquid crystal device using a single-layered insulating film in combination with an alignment film for alignment of a ferroelectric liquid crystal, it has been difficult to develop a uniform alignment state having a folded or chevron structure of smectic layers over the entire extension of a liquid crystal panel, thus failing to provide a high transmittance or contrast due to an influence of refractive index or defects of liquid crystal molecules, in some cases.

SUMMARY OF THE INVENTION

In view of the above-mentioned difficulties of the prior art, an object of the present invention is to provide a ferroelectric liquid crystal device with an improvement in preventing, occurrence of short circuit between opposite electrodes and in alignment of liquid crystal molecules.

According to the present invention, there is provided a ferroelectric liquid crystal device, comprising: a pair of substrates each provided with an electrode pattern and an insulating layer covering the electrode pattern, and a ferroelectric liquid crystal disposed between the substrates;

wherein the insulating layer has a multi-layer structure including a first insulating layer and a second insulating layer formed through a different process than that for the first insulating layer.

In the present invention, it is preferred that the first insulating layer is an inorganic oxide film formed by sputtering and the second insulating layer is an inorganic oxide film formed by printing.

More specifically, in the ferroelectric liquid crystal device according to the present invention, the first insulating layer formed by sputtering on an electrode pattern ensures a film hardness and covering of an electroconductive foreign matter, and the second insulating layer formed by printing provides an improvement in dielectric strength and in formation of a C1 uniform alignment state having a chevron structure of smectic layers.

These and other objects, features and advantages of the present invention will become more apparent upon a consideration of the following description of the preferred embodiments of the present invention taken in conjunction with the accompanying drawings, wherein like parts are denoted by like reference numerals.

BRIEF DESCRIPTION OF THE DRAWINGS

FIG. 1 is a schematic partial sectional view for illustration of a first embodiment of the ferroelectric liquid crystal device according to the invention FIG. 2 is a schematic partial sectional view for illustration of a conventional ferroelectric liquid {crystal device.

FIG. 3 is a schematic partial sectional view for illustration of a second embodiment of the ferroelectric liquid crystal device according to the invention.

FIG. 4 is a schematic view for illustration of a model of uniform alignment.

DESCRIPTION OF THE PREFERRED EMBODIMENTS

Figure 5B:
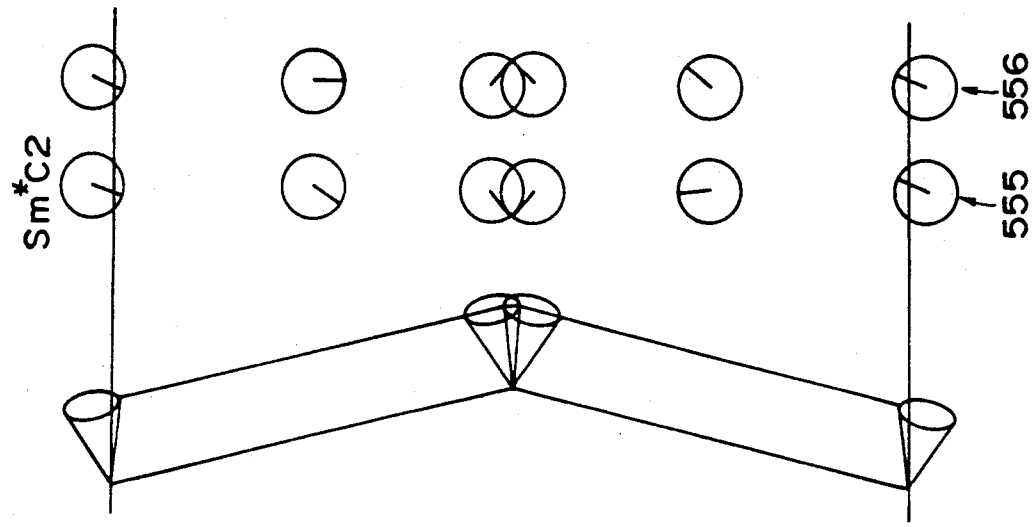
FIGS. 5A and 5B are schematic views for illustration of C director arrangements respectively in Sm*C1 state and Sm*C2 state, respectively.

FIG. 1 schematically illustrates an embodiment of the ferroelectric liquid crystal device (cell) according to the present invention.

Referring to FIG. 1, the cell includes a pair of substrates 106 each having thereon a transparent electrode layer 105, a metal wire (auxiliary electrode) layer 104, a first insulating layer 102, a second insulating layer 103, and an alignment film 108, and a ferroelectric liquid crystal 107 disposed between the substrates 106. FIG. 1 also shows a piece of foreign matter 101 accidentally present between the substrates.

Each transparent electrode layer 105 may comprise a film of $In_2O_3$, ITO (indium tin oxide), etc., in a thickness of 250–5000 Å, preferably 500–3000 Å.

The metal wire 104 is disposed in order to lower the electrical resistance of the transparent electrode film and may comprise a film of a metal, such as Mo, Ta, Al, Ti, Cr or an alloy of these metals, in a thickness of 250–5000 Å, preferably 500–3000 Å.

The first insulating layer 102 may comprise an insulating film formed by sputtering and may have a thickness in the range of 300–3000 Å, preferably 500 –2000 Å. The first insulating layer may preferably comprise an inorganic oxide film of, e.g., silcon monoxide, silicon dioxide, aluminum oxide, zirconia, cerium oxide, ditantalum pentaoxide, or titanium dioxide.

The second insulating layer 103 may be formed by printing or wet-coating followed by calcination in a thickness of 250–5000 Å, 500–3000 Å. The second insulating layer 103 may preferably comprise a film of, e.g., silicon monoxide, silicon dioxide, aluminum oxide, zirconia, cerium oxide, ditantalum pentaoxide, and titanium dioxide. These materials can be used in a mixture of two or more species.

The insulating layer 103 may preferably be formed by wet-coating or printing of metal oxide sources, such as hydroxides or organometallic compounds of metals as described above, followed by calcination. Examples of particularly preferred classes of organometallic compounds may include: organoalkoxy-silanes, such as organomethoxysilane and organoethoxysilanes; orthotitanate esters, such as tetraisopropyl titanate and butyl titanate dimer; and titanium acetylacetonate, and polytitanium acetyl-acetonate. These metal oxide sources can be used in mixture of two or more species in appropriate ratios according to a desired composition of the insulating layer.

After the coating, a film of such a metal oxide source may be calcined at a temperature of preferably 200°–500° C., more preferably 250°–400° C. so as to provide an intimate metal oxide film without thermally deteriorating the performance of the resultant device.

The alignment film 108 may preferably comprise a film of a polyimide of various types, particularly preferably a fluorine-containing polyimide, specific examples of which may include those represented by the following structural formulae:

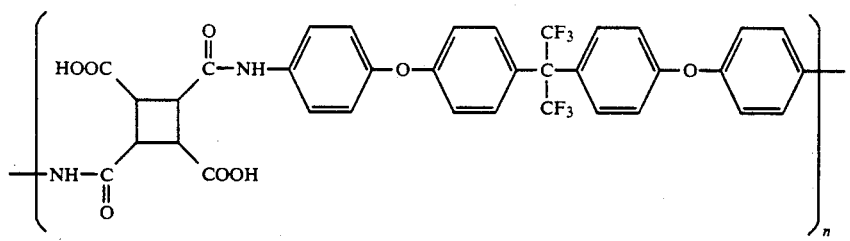

(n(degree of polymerization) = 700–2000)

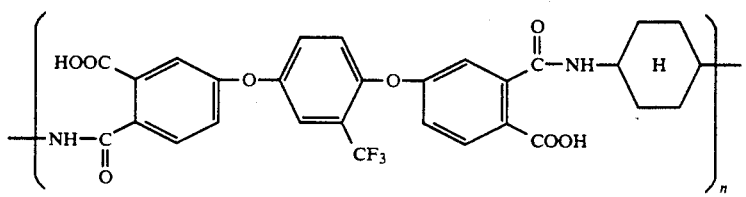

(n = 700–2000)

-continued
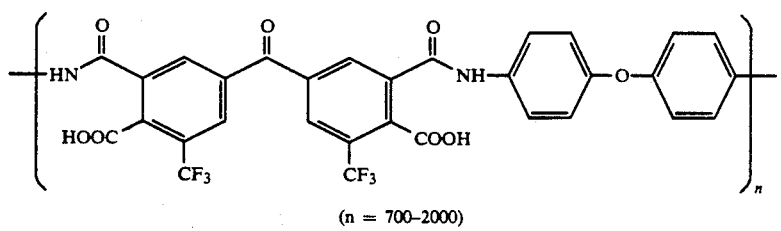
(n = 700–2000)
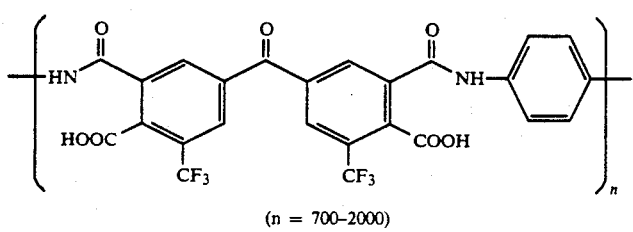
(n = 700–2000)
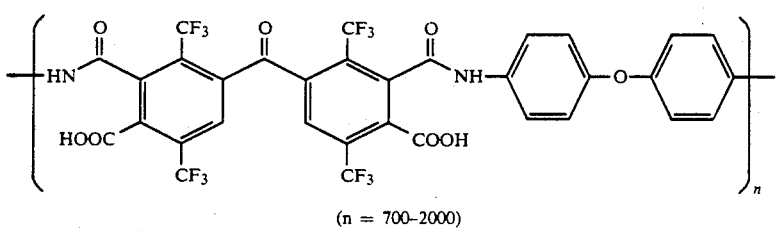
(n = 700–2000)
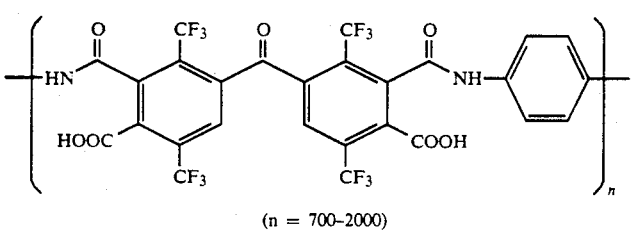
(n = 700–2000)
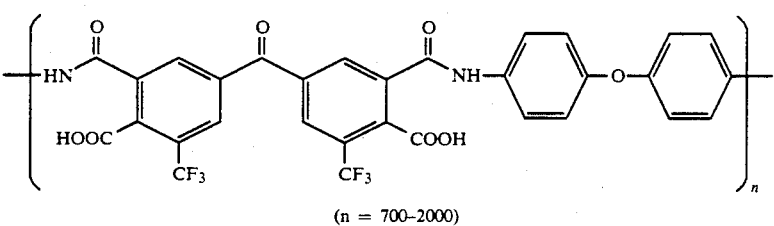
(n = 700–2000)
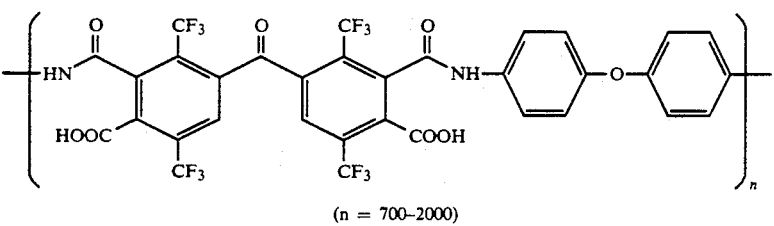
(n = 700–2000)
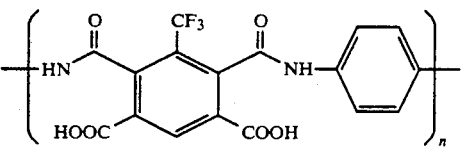
(n = 700–2000)

-continued
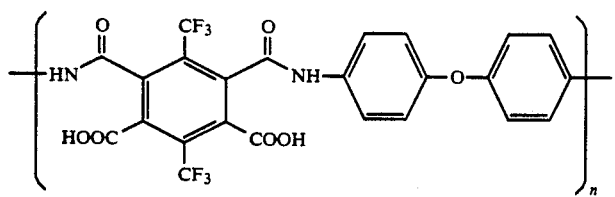
(n = 700–2000)
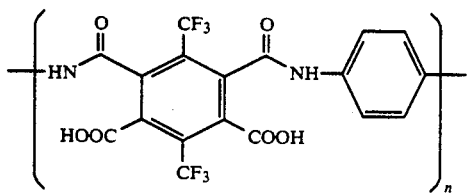
(n = 700–2000)
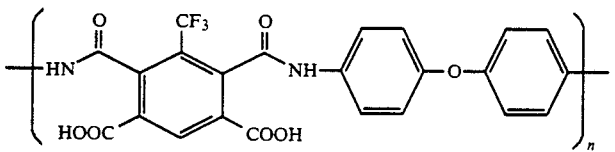
(n = 700–2000)
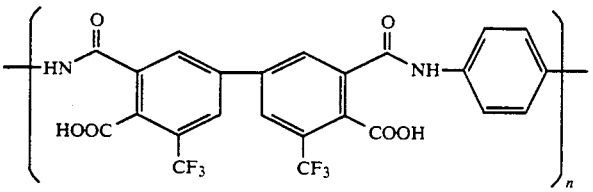
(n = 700–2000)
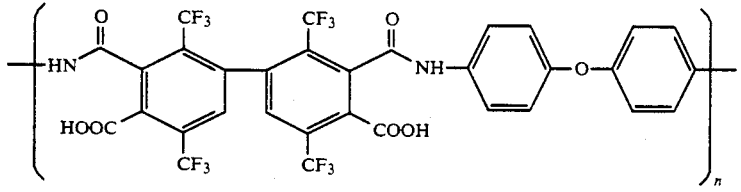
(n = 700–2000)
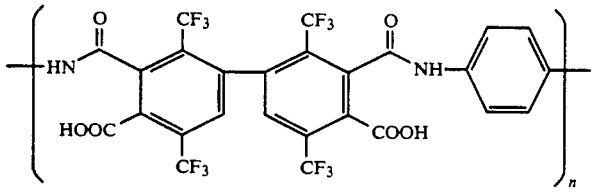
(n = 700–2000)
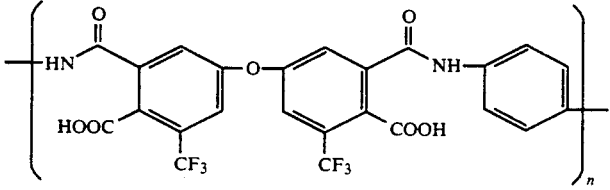
(n = 700–2000)

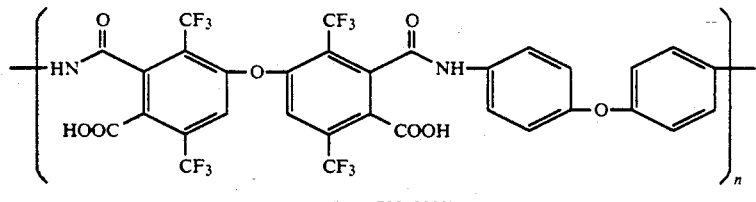

(n = 700-2000)

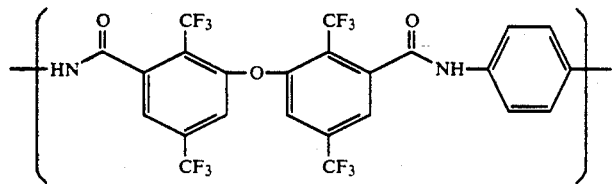

(n = 700-2000)

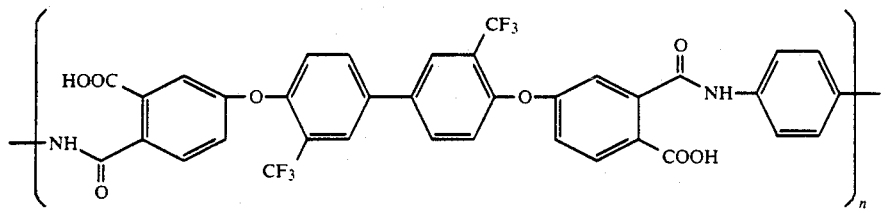

(n = 700-2000)

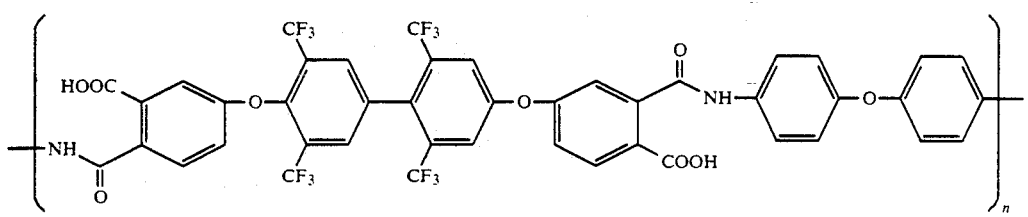

(n = 700-2000)

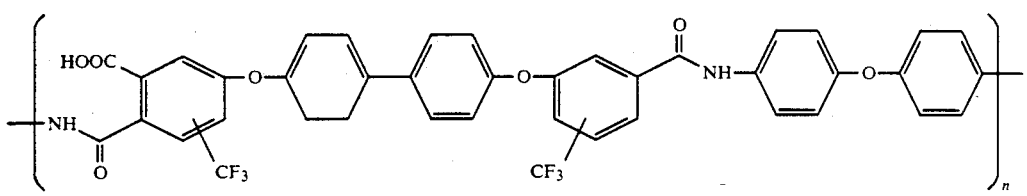

(n = 700-2000)

The alignment film 108 may preferably be formed in a thickness of 30-1000 Å.

Each substrate 106 may generally comprise a plate of, e.g., glass or plastic. The pair of substrates 106 may be disposed to provide a gap therebetween (e.g., 0.1-3 microns) which is small enough to suppress the formation of a helical structure of a chiral smectic ferroelectric liquid crystal 107, thus providing a uniform alignment state forming a chevron (folded) structure of smectic layers. The ferroelectric liquid crystal 107 may suitably be in a chiral smectic phase such as chiral smectic C phase (SmC*), chiral smectic G phase (SmG*), chiral smectic F phase (SmF*), chiral smectic I phase (SmI*) or chiral smectic H phase (SmH*).

Details of ferroelectric liquid crystal are described in, e.g., Le Journal De Physique letters, 36 (L69) 1975, "Ferroelectric Liquid Crystals"; Applied Physics Letters, 36 (11), 1980, "Submicro-Second Bistable Electrooptic Switching in Liquid Crystals"; Kotai Butsuri (Solid State Physics), 16 (141) 1981 "Ekisho (Liquid Crystal)"; U.S. Pat. Nos. 4,561,726; 4,589,996; 4,592,858; 4,596,667; 4,613,209; 4,614,609, and 4,622,165. Ferroelectric liquid crystals disclosed in these references may also be used in the present invention.

Specific examples of ferroelectric liquid crystals may include: decyloxybenzylidene-p'-amino-2-methylbutyl cinnamate (DOBAMBC), hexyloxybenzylidene-p'-amino-2-chloropropyl cinnamate, and 4-O-(2-methyl)-butylresorcylidene-4'-octylaniline (MBR8).

In the above-described structure of ferroelectric liquid crystal device, we have succeeded in uniformly providing a uniform alignment state forming a chevron structure of smectic layers by providing a high pretilt angle of liquid crystal molecules and arranging the directions of uniaxial alignment axes applied to opposite alignment films 108 to be identical and parallel or with some intersection.

Details of such a uniform alignment state are discussed in U.S. Pat. No. 4,932,758 (to Hanyu et al) but some explanation will be added hereinbelow with respect to its alignment state and model.

FIG. 4 is a schematic view for illustrating a model of a cell containing a chiral smectic liquid crystal in a uniform alignment state. Referring to FIG. 4, in a gap between a pair of alignment films 108 having surfaces 414a and 414b respectively provided with a common rubbing direction A, there are formed a plurality of smectic layers 431 each composed of a plurality of liquid crystal molecules in chiral smectic C phase including a molecule 436 adjacent to and forming a tilt angle with respect to a boundary. The smectic layers 431 constitute domains of different alignment states including an Sm*C1 domain 432 and an Sm*C2 alignment domain 433 which correspond to mutually opposite chevron (folding) directions with respect to the tilt angle of the liquid crystal molecules.

Further, at boundary parts 434 and 435 between the mutually different alignment domains Sm*C1 and Sm*C2, there are formed two types of defects 434 and 435 which can be confirmed to be a lightening defect and a hairpin defect, respectively, as a result of microscopic observation through a polarizer in the direction of a normal to the boundary 414a or 414b (i.e., substrate 106).

According to the present invention, it is possible to develop an Sm*C1 alignment state 432 forming a single layer-folding direction substantially over the entire panel area.

Figure 5A:
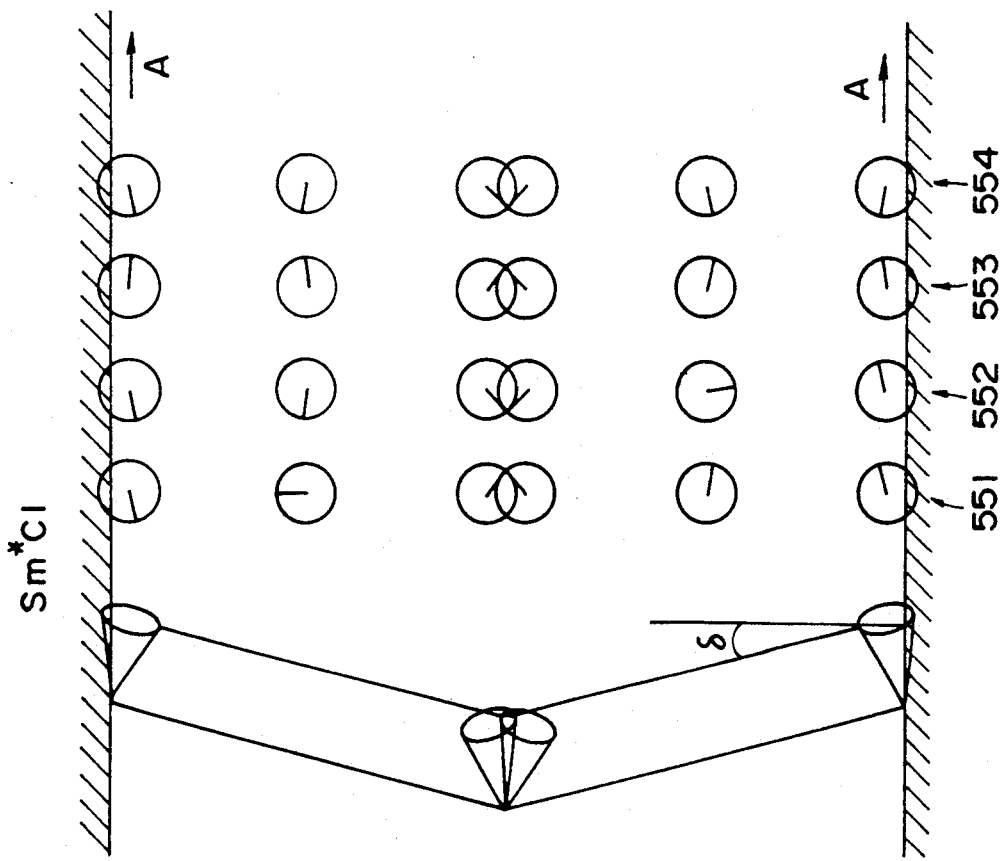

FIGS. 5A and 5B illustrate various arrangements of C directors (long axes of (LC) molecules) in Sm*C1 and Sm*C2 alignment. At 551 and 552 in FIG. 5A are shown two orientation states in a twist alignment state wherein C directors are twisted from one substrate to the other substrate in Sm*C1 alignment state. At 553 and 554 in FIG. 5A are shown two orientation states in a uniform alignment state wherein C directors are oriented in almost the same direction in Sm*C1 alignment state. Further, at 555 and 556 in FIG. 5B are shown two orientation states in a twist alignment state in Sm*C2 alignment state.

According to our study, among the above-mentioned various alignment states, the uniform alignment state given by the combination of orientation states 553 and 554 in Sm*C1 provides a largest contrast (highest transmittance). According to alignment conditions including control of pretilt and mutual directions of uniaxial alignment axes provided to opposite substrates, a twist alignment state providing two orientation states 551 and 552 is caused to be present in mixture with the uniform alignment state providing orientation states 553 and 554 in Sm*C1, thus deteriorating optical characteristics, such as contrast and transmittance.

According to the ferroelectric liquid crystal cell of the present invention, the uniform alignment state (553, 554) in Sm*C1 is stably formed to prevent co-presence of the twist alignment state (551, 552).

Hereinbelow, the present invention will be explained based on some examples.

EXAMPLE 1

A liquid crystal device having a sectional structure as shown in FIG. 1 was prepared.

Referring to FIG. 1, a glass substrate 106 was provided with a transparent electrode layer 105 of ITO (indium tin oxide) and a Mo metal wire (auxiliary electrode) layer 104 in respective patterns.

Each substrate 106 provided with electrode patterns 105 and 104 was further coated with a 600 Å-thick $Ta_2O_5$ film as a first insulating layer 102 by sputtering at a power of 2 KW without preliminary heating of the substrate in an atmosphere of $Ar/O_2 = 180/20$ at a pressure of $3 \times 10^{-3}$ torr, and then with a 600 Å-thick $SiO_2/TiO_2$ (8/2) mixture film as a second insulating layer 103 by printing and calcination.

The ink used for formation of the second insulating layer 103 was a solution in butyl cellosolve or N-methylpyrrolidone of a mixture of an organotitanium compound and an organosilicon compound containing Ti and Si at a molar ratio of 8:2 and a solid content of 8 wt. % and having a viscosity of 30 centipoise ("MOF Ti-Si-Ink Film 088202-30", mfd. by Tokyo Ohka K.K.). The printing was performed by using a printer ("Angstromer", mfd. by Nihon Shashin Insatsu K.K.) having an inking roller with 60 micron-wide concavities of 8 microns in depth of 40 micron-wide convexities and a plate of Sirel. After the printing, the ink on the substrate was subjected to leveling and drying on a hot plate heated to 80° C. for 1 min. under irradiation with ultraviolet rays at 3.6 $J/cm^2$ from a low-voltage mercury lamp and then calcined at 300° C. for 1 hour.

Each substrate was further coated with a 40 Å-thick polyimide alignment film 108, which was then subjected to rubbing.

A pair of the thus prepared electrode plate structures each including substrate 106 coated with a transparent electrode layer 105, a metal wire layer 104, a first insulating layer 102, a second insulating layer 103 and an alignment film 108, were fixed to each other so that thin rubbing directions extending in parallel with each other and in an identical direction with an epoxy resin applied to the periphery there of and with bead spacers disposed therebetween to form a blank cell, into which a ferroelectric liquid crystal ("CS-1014" (trade name), available from Chisso K.K.) showing a phase transition series as shown below was injected and gradually cooled at a rate of 0.5° C./hr from its isotropic phase to 30° C. to form a FLC panel having a liquid crystal layer thickness of 1.45±0.04 micron:

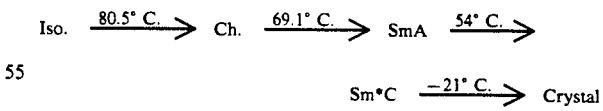

The thus prepared FLC panel showed a stable 25 uniform alignment state in Sm*C1 and also showed an excellent performance in preventing short circuit between opposite electrodes.

COMPARATIVE EXAMPLE 1

Example 1 was repeated except that the first insulating layer was omitted and a single insulating layer 103 was formed in a thickness of 1200 Å by printing and calcination using an inking roller having 12 micron-deep concavities in the printer and an ink identical to the one used in Example 1 except for a Ti:Si-molar ratio of 1:1 ("MOF Ti-Si-Ink Film 081102-30", mfd. by Tokyo Ohka K.K.) otherwise in the same manner as in Example 1 to prepare an FLC panel as shown in FIG. 2 (an alignment layer 108 identical to the one formed in Example 1 was actually formed but is mitted from showing).

The panel production in Example 1 and Comparative Example 1 was repeated to provide 6 panels each, and the resultant panels were evaluated with respect to occurrence of short circuit between opposite electrodes and alignment characteristic. The results are shown in the following Table 1.

TABLE 1

| | Rate of occurrence of short circuit between opposite electrodes | | Alignment |
|---|---|---|---|
| | (panels/panels) | (parts/panel) | characteristic* |
| Ex. 1 | 3/6 | 0–1 | ○ |
| Comp. Ex. 1 | 6/6 | 1–5 | x |

*The alignment characteristic was evaluated according to the following standards.
○: There was provided a uniform alignment state which allowed a uniform control of molecular orientations over the entire panel area by voltage application.
x: There was formed a part in the panel where a liquid crystal molecular alignment disorder was observed and a uniform switching characteristic could not be attained. As a result, a fluctuation in contrast was observed over the extension of the display picture.

The difference in rate of occurrence of short circuit between opposite electrodes may be attributable to the following factors.

In the panel according to Example 1 as shown in FIG. 1, even if a conductive foreign matter 101 is present between a pair of opposite transparent electrodes 105, the insulation (i.e., prevention of short circuit) between the opposite electrodes is ensured by the presence of the first insulating layers 102 of hard insulating $Ta_2O_5$ films formed by sputtering. On the contrary, in the panel according to Comparative Example 1 as shown in FIG. 1, there are no first insulating layers 102 of hard insulating $Ta_2O_5$ films formed by sputtering, so that short circuit between opposite electrodes is liable to be caused due to breakage of or failure in uniform coating by the second insulating layers formed by wet-coating and calcination.

EXAMPLE 2

FIG. 3 is a schematic partial sectional view of another embodiment of the ferroelectric liquid crystal device (panel) according to the present invention including a color filter layer on one substrate.

Such a liquid crystal panel as shown in FIG. 3 was prepared in the same manner as in Example 1 except that one glass substrate 106 was first coated with a color filter layer 10 including colored polyimide filter patterns R, G and B and a polyimide protective layer was provided with a transparent electrode layer 105 and metal wires 104, coated with a 900 Å-thick first insulating layer 102 of $Ta_2O_5$ formed by sputtering and with a 1200 Å-thick second insulating layer 103 of $TiO_2:SiO_2$ 8:2 formed by printing and calcination similarly as in Example 1, and then with a polyimide alignment film 108 similar to the one in Example 1, and the resultant electrode structure including a color filter layer 10 was combined with an electrode plate structure prepared in the same manner as in Example 1.

COMPARATIVE EXAMPLE 2

A ferroelectric liquid crystal panel was prepared in the same manner as in Example 2 except that the second insulating layers formed by printing and calcination were omitted.

COMPARATIVE EXAMPLE 3

A ferroelectric liquid crystal panel was prepared in the same manner as in Example 2 except that the first insulating layers formed by sputtering were omitted.

Eight panels each were prepared according to Example 2 and Comparative Examples 2 and 3, and the panels were evaluated with respect to occurrence of short circuit between opposite electrodes and alignment characteristic, whereby the results as shown in the following Table 2 were obtained.

TABLE 2

| | Rate of occurrence of short circuit between opposite electrodes | | Alignment |
|---|---|---|---|
| | (panels/panels) | (parts/panel) | characteristic* |
| Ex. 2 | 2/8 | 0–2 | ○ |
| Comp. Ex. 2 | 4/8 | 0–5 | x |
| Comp. Ex. 2 | 8/8 | 9–43 | ○ |

*The alignment characteristic was evaluated in the same manner as in Table 1.

EXAMPLE 3

An FLC panel was prepared in the same manner as in Example 1 except that the second insulating layer was formed by printing and calcination of the ink having a Ti:Si molar ratio of 1:1 ("MOF Ti-Si Ink Film 081102-30", Tokyo Ohka K.K.) used in Comparative Example 1 instead of the ink having a Ti:Si molar ratio of 8:2 ("MOF Fi-Si-Ink Film 088202-30", Tokyo Ohka K.K.) used in Example 1.

The FLC panel thus produced showed a good alignment characteristic and a low ratio of insulating failure similarly as in Examples 1 and 2.

COMPARATIVE EXAMPLE 4

An FLC panel was prepared in the same manner as in Example 3 except that the second insulating layer was prepared as follows.

More specifically, a glass substrate 106 provided with a transparent electrode layer 105, a metal wire layer 104 and a first insulating layer 103 similarly as in Example 1 was placed on a rotating bed of a spin coater and coated with a solution of 0.5 ml of an adhesion promotor ("VM 651", mfd. by E.I. Du Pont de Nemous Co.) in 500 ml of methanol, followed by 15 sec. of rotation an about 2000 rpm, coating with a preliminarily prepared 0.5 w/v % solution of nylon 6/6 in a 6/4 mixture of m-cresol/methanol, 50 sec of rotation at about 4000 rpm and then about 30 min. of calcination at 130° C., to form a 600 Å-thick second insulating layer 103.

Eight panels each were prepared according to Example 3 and Comparative Example 4, and the panels were evaluated with respect to occurrence of short circuit between opposite electrodes and alignment characteristic, whereby the results as shown in the following Table 3 were obtained.

TABLE 3

| | Rate of occurrence of short circuit between opposite electrodes | | Alignment characteristic* |
|---|---|---|---|
| | (panels/panels) | (parts/panel) | |
| Ex. 3 | 2/6 | 0–1 | ○ |
| Comp. Ex. 4 | 3/8 | 0–5 | x |

*The alignment characteristic was evaluated in the same manner as in Table 1.

As described above, according to the present invention, a ferroelectric liquid crystal device is produced by forming two layers of preferably inorganic insulating layers by different processes including sputtering and wet-coating, whereby a good alignment characteristic is provided with a remarkably decreased rate of occurrence of short circuit between opposite electrodes so that ferroelectric liquid crystal devices can be produced at a good productivity and thus at a lower production cost.

What is claimed is:

1. An electrode plate comprising a substrate provided with an electrode pattern with a first said electrode pattern being coated successively with a first insulating layer of $Ta_2O_5$, a second insulating layer of a$TiO_2$-$SiO_2$ mixture and a polyimide-type alignment film.

2. An electrode plate according to claim 1, wherein said polyimide-type alignment film comprises a fluorine-containing polyimide.

3. An electrode plate according to claim 2, wherein said fluorine-containing polyimide is a trifluoromethyl-substituted polyimide.

4. An electrode plate according to claim 1, wherein the polyimide-type alignment film has been subjected to a rubbing treatment for aligning liquid crystal molecules.

5. An electrode plate according to claim 1, wherein said electrode pattern comprises a transparent electrode film and a metal layer disposed on a part of the transparent electrode film.

6. An electrode plate according to claim 5, wherein said metal layer comprises molybdenum.

7. An electrode plate according to claim 1, wherein said first insulating layer of $Ta_2O_5$ has been formed by sputtering.

8. An electrode plate according to claim 1, wherein said second insulating layer of a $TiO_2$—$SiO_2$ mixture has been formed by printing and calcination of a mixture of an organotitanium compound and an organosilicon compound.

9. A color filter plate comprising a substrate provided with a color filter pattern and an electrode pattern, said electrode pattern being coated successively with a first insulating layer of $Ta_2O_5$, a second insulating layer of a $TiO_2$-$SiO_2$ mixture and a polyimide-type alignment film.

10. A colon filter plate according to claim 9, wherein said polyimide-type alignment film comprises a fluorine-containing polyimide.

11. A color filter plate according to claim 10, wherein said fluorine-containing polyimide is a trifluoromethyl-substituted polyimide.

12. A color filter plate according to claim 9, wherein the polymide-type alignment film has been subjected to a rubbing treatment for aligning liquid crystal molecules.

13. A color filter plate according to claim 9, wherein said electrode pattern comprises a transparent electrode film and a metal layer disposed on a part of the transparent electrode film.

14. A color filter plate according to claim 13, wherein said metal layer comprises molybdenum.

15. A color filter plate according to claim 9, wherein said first insulating layer of $Ta_2O_5$ has been formed by sputtering.

16. A color filter plate according to claim 9, wherein said second insulating layer of a $TiO_2$-$SiO_2$ mixture has been formed by printing and calcination of a mixture of an organotitanium compound and an organosillicon compound.

17. A color filter plate according to claim 9, wherein a transparent protective layer is disposed between the color filter pattern and the electrode pattern.

18. A color filter plate according to claim 9, wherein said color filter pattern comprises a polyimide.

19. A color filter plate according to claim 17, wherein said transparent protective layer comprises a polyimide.

20. A liquid crystal device comprising a pair of substrates each provided with an electrode pattern, said electrode pattern being coated successively with a first insulating layer of $Ta_2O_5$, a second insulating layer of a $TiO_2$—$SiO_2$ mixture and a polyimide-type alignment film, and a ferroelectric liquid crystal disposed between the substrates.

21. A device according to claim 20, wherein said polyimide-type alignment film comprises a fluorine-containing polyimide.

22. A device according to claim 21, wherein said fluorine-containing polyimide is a trifluoromethyl-substituted polyimide.

23. A device according to claim 20, wherein the polyimide-type alignment films formed on the pair of substrates have been rubbed in directions which are parallel and identical to each other.

24. A device according to claim 20, wherein the polyimide-type alignment films formed on the pair of substrates have been rubbed in directions which interest each other.

25. A device according to claim 20, wherein said electrode pattern comprises a transparent electrode film and a metal layer disposed on a part of the transparent electrode film.

26. A device according to claim 25, wherein said metal layer comprises molybdenum.

27. A device according to claim 20, wherein said first insulating layer of $Ta_2O_5$ has been formed by sputtering.

28. A device according to claim 20, wherein said second insulating layer of a $TiO_2$-$SiO_2$ mixture has been formed by printing and calcination of a mixture of an organotitanium compound and an organosilicon compound.

* * * * *

UNITED STATES PATENT AND TRADEMARK OFFICE
CERTIFICATE OF CORRECTION

PATENT NO. : 5,270,846
DATED : December 14, 1993
INVENTOR(S) : YASUYUKI WATANABE, ET AL.

Page 1 of 2

It is certified that error appears in the above-indentified patent and that said Letters Patent is hereby corrected as shown below:

COLUMN 1

Line 56, "1000 Åthick" should read --1000 Å-thick--.
Line 65, "ness" should read --ness.--.

COLUMN 2

Line 42, "ment in preventing," should read --ment in preventing--.

COLUMN 3

Line 11, "invention" should read --invention.--.
Line 13, "{crystal" should read --crystal--.

COLUMN 12

Line 43, "there of" should read --thereof--.
Line 57, insert: --Iso: isotropic phase
    Ch: cholesteric phase
    SmA: smectic phase
    Sm*C: chiral smectic C phase.--.
Line 58, "stable 25" should read --stable--.

COLUMN 13

Line 6, "mitted" should read --omitted--.
Line 62, "O$_2$8:2" should read --O$_2$ = 8:2--.

COLUMN 14

Line 55, "E.I. Du Pont de Nemous Co.)" should read --E.I. Du Pont de Nemours Co.)--.

UNITED STATES PATENT AND TRADEMARK OFFICE
CERTIFICATE OF CORRECTION

PATENT NO. : 5,270,846
DATED : December 14, 1993
INVENTOR(S) : YASUYUKI WATANABE, ET AL.

It is certified that error appears in the above-indentified patent and that said Letters Patent is hereby corrected as shown below:

COLUMN 15

Line 23, "pattern with a first" should read --pattern,--.
Line 57, "colon" should read --color--.

COLUMN 16

Line 45, "interest" should read --intersect--.

Signed and Sealed this

Twenty-third Day of August, 1994

Attest:

BRUCE LEHMAN

Attesting Officer     Commissioner of Patents and Trademarks